(12) United States Patent
Peuziat

(10) Patent No.: US 10,343,778 B2
(45) Date of Patent: Jul. 9, 2019

(54) RETRACTABLE SUPPORT FOR A SCREEN AND INTERIOR LAYOUT ASSEMBLY OF AN AIRCRAFT CABIN COMPRISING SUCH A SUPPORT

(71) Applicant: DASSAULT AVIATION, Paris (FR)

(72) Inventor: Denis Peuziat, Jouy le Moutier (FR)

(73) Assignee: DASSAULT AVIATION, Paris (FR)

( * ) Notice: Subject to any disclaimer, the term of this patent is extended or adjusted under 35 U.S.C. 154(b) by 106 days.

(21) Appl. No.: 15/160,251

(22) Filed: May 20, 2016

(65) Prior Publication Data

US 2016/0340041 A1    Nov. 24, 2016

(30) Foreign Application Priority Data

May 22, 2015    (FR) ..................... 15 01071

(51) Int. Cl.

| | |
|---|---|
| B64D 11/00 | (2006.01) |
| B64D 11/06 | (2006.01) |
| F16M 13/02 | (2006.01) |
| B60R 11/02 | (2006.01) |
| F16M 11/14 | (2006.01) |
| F16M 11/20 | (2006.01) |

(52) U.S. Cl.
CPC ...... *B64D 11/0015* (2013.01); *B60R 11/0235* (2013.01); *B64D 11/06* (2013.01); *F16M 11/14* (2013.01); *F16M 11/2064* (2013.01); *F16M 13/02* (2013.01); *F16M 2200/065* (2013.01); *F16M 2200/08* (2013.01)

(58) Field of Classification Search
CPC . B64D 11/0015; B64D 11/06; B60R 11/0235; F16M 11/2021; F16M 11/24; F16M 13/02; F16M 2200/065

USPC ......................................................... 224/275
See application file for complete search history.

(56) References Cited

U.S. PATENT DOCUMENTS

| | | | | |
|---|---|---|---|---|
| 5,177,616 A | | 1/1993 | Riday | |
| 5,611,513 A | * | 3/1997 | Rosen | F16M 11/10 248/222.11 |
| 5,996,954 A | * | 12/1999 | Rosen | B60R 11/0235 248/278.1 |
| 6,007,036 A | * | 12/1999 | Rosen | B60R 11/0235 224/281 |
| 6,375,259 B1 | * | 4/2002 | Ma | A47C 7/72 297/154 |

(Continued)

OTHER PUBLICATIONS

French Search Report of priority application.

*Primary Examiner* — Peter N Helvey
(74) *Attorney, Agent, or Firm* — Davidson, Davidson & Kappel, LLC

(57) ABSTRACT

A retractable support for a screen, and interior layout assembly for an aircraft cabin comprising such a support are provided. The retractable support for a screen includes a housing for receiving the screen in a retracted position, and an arm movably mounted relatively to the housing between a retracted position inside the housing and a deployed position outside the housing. The arm includes first and second rigid segments jointed with each other so that the second segment pivots relatively to the first segment around a first pivot axis between a compact configuration, in which the second segment is fitted into a recess of the first segment, and an extended configuration, in which the second segment extends out of said recess.

19 Claims, 11 Drawing Sheets

(56) References Cited

U.S. PATENT DOCUMENTS

| | | | | |
|---|---|---|---|---|
| 6,758,521 | B2 * | 7/2004 | Imamura | B60R 11/0235 |
| | | | | 297/217.3 |
| 7,261,266 | B2 * | 8/2007 | Satterfield | B60R 11/0235 |
| | | | | 248/284.1 |
| 8,794,579 | B2 * | 8/2014 | Sturman | F16M 11/105 |
| | | | | 248/160 |
| 9,316,346 | B2 * | 4/2016 | Lau | F16M 11/126 |
| 9,617,001 | B2 * | 4/2017 | Zimmermann | B64D 11/00153 |
| 9,732,901 | B2 * | 8/2017 | Satterfield | F16M 11/2021 |
| 2008/0296449 | A1 * | 12/2008 | Carnevali | B60R 11/02 |
| | | | | 248/205.1 |
| 2010/0171350 | A1 | 7/2010 | Large et al. | |
| 2011/0303805 | A1 * | 12/2011 | Lau | F16M 11/126 |
| | | | | 248/125.8 |
| 2013/0112841 | A1 * | 5/2013 | Fan | F16M 13/00 |
| | | | | 248/622 |

* cited by examiner

RETRACTABLE SUPPORT FOR A SCREEN AND INTERIOR LAYOUT ASSEMBLY OF AN AIRCRAFT CABIN COMPRISING SUCH A SUPPORT

This claims the benefit of French Patent Application FR 15 01071, filed May 22, 2015 and hereby incorporated by reference herein.

The present invention relates to a retractable support for a screen, of the type comprising:
a housing for receiving the screen in a retracted position, and
an arm, movably mounted relatively to the housing between a retracted position inside the housing and a deployed position outside the housing, the arm comprising a proximal end for jointing with the housing and a distal end for jointing with the screen.

The present invention also relates to an interior layout assembly of an aircraft cabin comprising such a support. Such an assembly is intended to be mounted in an aircraft cabin in order to participate in the comfort of the occupants of the cabin.

BACKGROUND

It is common to equip aircraft cabins with screens intended for use by the passengers. These screens may be intended to inform the passengers on the flight parameters, but also may allow them to access multimedia contents.

These screens are often fitted into a fixed element of the cabin, which makes them not very convenient for being consulted by the passengers. Members for supporting these screens have therefore been developed, comprising an arm provided with an end for attachment to a fixed element of the cabin and an end for jointing with the screen. These supporting members are generally adapted so as to support the screen facing a cabin armchair, so as to allow easy consultation of the screen by a passenger sitting in said armchair.

For security reasons, certification of aircraft requires that each screen present in the aircraft is retracted or stored away during certain critical flight phases of the aircraft, notably upon take off and landing. In certain cases also, the passenger may wish for his/her own comfort that the screen bet retracted, for example so that this screen does not prevent his/her displacement inside the aircraft.

Consequently, the supporting members are designed so as to allow the displacement of the screen between a position of use facing the cabin armchair and a storage position. A known storage position is a retracted position inside an armrest of the armchair. However, providing such a storage position for the screen poses significant constraints on the design of the armchair, and more particularly of its armrest, notably preventing the making of certain forms of armrests or retractable armrests.

In the last few years, with the development of tactile tablets, passengers increasingly board aircraft with their own tactile tablet, a tablet which they generally wish to consult during the flight. Most often, the passengers do not have any support at their disposal, and therefore have to lay their tablet on their knees, which forces them to permanently to bow their head downwards and may cause in the long run back or neck pain. Additionally, the tablet may easily fall on the floor of the cabin and be deteriorated in the case of sudden acceleration or deceleration of the aircraft, for example when the latter is in an area with turbulences.

In order to overcome these drawbacks, devices for supporting tablets for aircraft have been developed recently.

These supporting devices generally appear as a jointed arm having a proximal end attached to the side ledge of the cabin («side ledge») and a distal end provided with a jaw with suitable dimensions for grasping with retaining different models of tablets. As this arm has to be stored away during critical flight phases, the arm is most often able to be disassembled, which poses the problem of the storage of said arm, but also of the tablet which it supports.

A partial solution is brought by a known system formed with a device for supporting tablet comprising a retractable jointed arm in a housing made in the side ledge of the cabin. However, the small volume of the housing is incompatible with receiving a tablet inside said housing. If the problem of storing the arm is therefore solved with this known system, the problem remains of storing the tablet during the critical flight phases.

It would thus be desirable to be able to retract not only the supporting device inside the side ledge of the cabin, but also the tablet. However, the side ledge is extremely congested, notably since it is already used for storing tables of the aircraft during critical flight phases, as described in patent application FR 15 00208. The space available for storing other elements, such as tactile tablets, inside the side ledge is therefore very reduced.

SUMMARY OF THE INVENTION

An object of the invention is therefore to allow retraction both of a screen and of its support in a reduced space.

For this purpose, a retractable support of the aforementioned type is provided, wherein the arm comprises first and second rigid segments jointed with each other so that the second segment pivot relatively to the first segment around a first pivot axis between a compact configuration, wherein the second segment is fitted into a recess of the first segment, and an extended configuration, in which the second segment extends out of said recess.

By means of this feature, the arm may occupy a highly compact configuration when it is retracted inside the housing, which gives the possibility of minimizing the space occupied by said arm and of clearing a maximum room for storing the tablet inside the housing. It is thus possible to produce a support having a housing of reduced size and which will easily be accommodated in the side ledge of an aircraft cabin.

According to particular embodiments of the invention, the retractable support also has one or several of the following features, taken individually or according to any technically possible combination(s):
the second segment defines the distal end;
the arm comprises a third rigid segment jointed with the first segment so as to pivot relatively to the first segment around a second pivot axis between a folded-back position, wherein the first and third segments are placed side by side over substantially the whole of their length, and a deployed position;
the first and second pivot axes are substantially parallel to each other;
the first and third segments are each substantially rectilinear and, in a deployed position, the first and third segments are substantially orthogonal to each other;
in a compact configuration, the distal end is interposed between the first and second pivot axes and, in the extended configuration, the first pivot axis is interposed between the distal end and the second pivot axis;

the arm comprises a fourth rigid segment jointed with the third segment so as to pivot relatively to the third segment around a third pivot axis;

the second and third pivot axes are substantially orthogonal to each other;

the fourth segment defines the proximal end;

the third segment is substantially rectilinear while being elongated along an elongation direction, and the third pivot axis is substantially parallel to said elongation direction;

the retractable support comprises a slider connection for the sliding of the proximal end of the arm relatively to the housing along a sliding direction;

the sliding direction is substantially parallel to the elongation direction of the third segment;

the housing defines a first space for receiving the screen in a retracted position and a second space for receiving the arm in a retracted position, the housing also having an opening with a general T-shape through which the first and second receiving spaces open on the outside of the housing, the bar of the T forming the portion of the opening through which the first receiving space opens on the outside of the housing, and the foot of the T forming the portion of the opening through which the second receiving space opens on the outside of the housing;

the retractable support comprises a member for attaching the screen to the support, and a jointed connection for jointing the attachment member to the distal end of the arm around at least two axes.

the first segment has a casing and comprises a body extending over substantially the whole of the width of the casing, taken parallel to the first pivot axis, as well as a finger protruding from the body while being shifted along a direction parallel to the first pivot axis relatively to a longitudinal median axis of the casing, the body having a face, for which at least one portion is positioned set back towards the inside of the first segment relatively to the casing along a direction perpendicular to the longitudinal median axis and to the first pivot axis, a first space being defined between said portion and the casing, the finger having a side face positioned set back towards the inside of the first segment relatively to the casing along a direction parallel to the first pivot axis, a second space being defined between said side face and the casing, the first and second spaces being cased side by side, the recess being formed by the joining up of the first and second spaces.

An object of the invention is also an interior layout assembly of an aircraft cabin, comprising a console including at least one retractable support as defined above.

According to a particular embodiment of the invention, the console forms a side ledge of the cabin.

BRIEF DESCRIPTION OF THE DRAWINGS

Other features and advantages of the invention will become apparent upon reading the description which follows, only given as an example and made with reference to the appended drawings, wherein.

DETAILED DESCRIPTION

Figure 1:
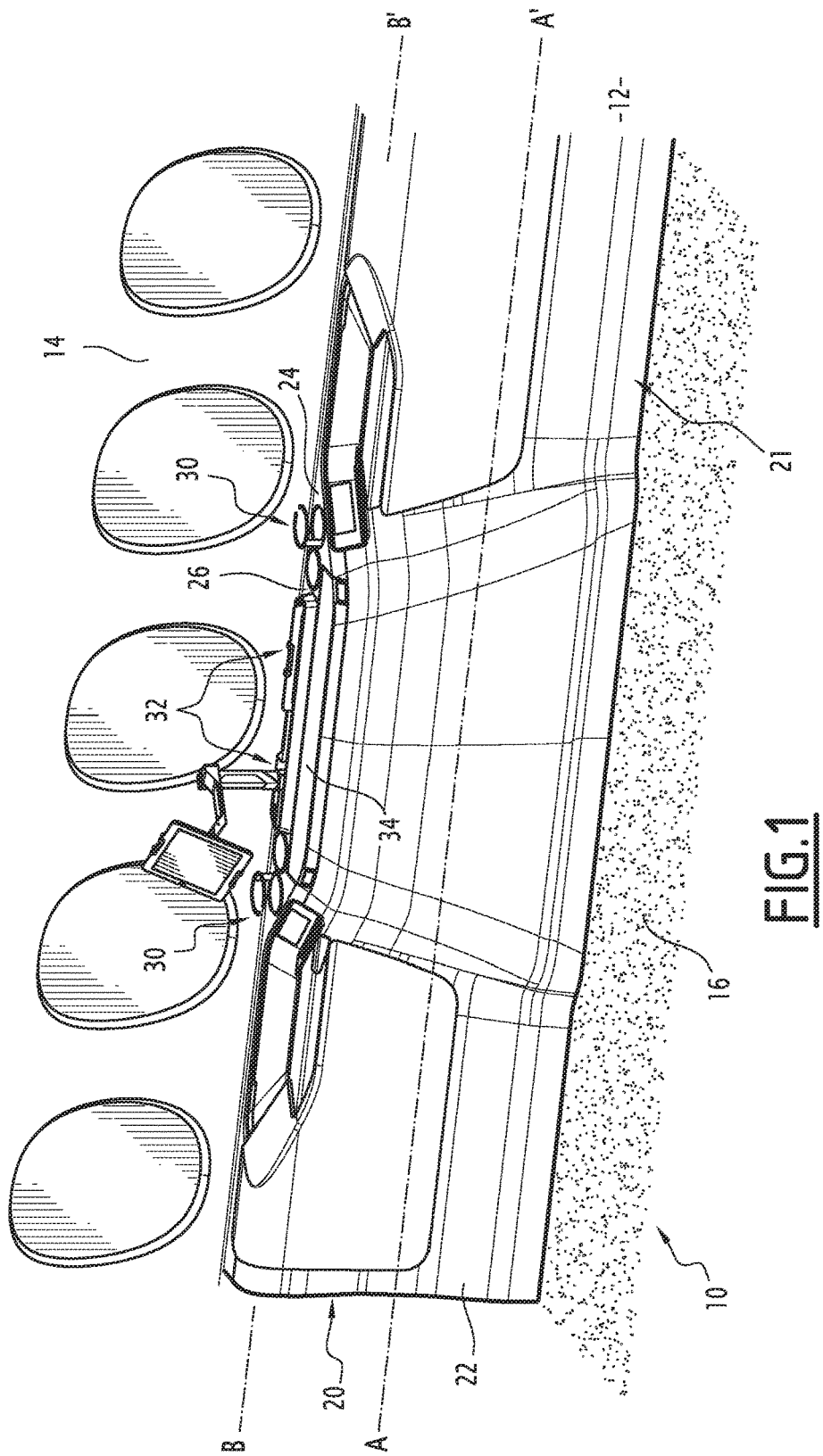
FIG. 1 is a perspective, partly top view of an interior layout assembly according to an embodiment of the invention.

An interior layout assembly 10 of a cabin 12 of an aircraft according to an embodiment of the invention is illustrated by FIGS. 1 to 11.

The cabin 12 of the aircraft is laterally delimited by the fuselage 14 and downwards by a floor 16. It extends here along a longitudinal axis A-A'.

The layout assembly 10 is mounted in the cabin 12 so as to be accessible to the occupants of the cabin 12. It includes a console 20 comprising a frame 21 having a flank 22 extending substantially vertically and an upper supporting plate 24 defining a substantially horizontal surface 26 for supporting objects.

The console 20 extends along a main horizontal axis B-B'. In the illustrated example, this axis B-B' extends substantially parallel to cabin longitudinal axis A-A', and the console 20 is positioned along the fuselage 14; the console 20 thus forms a side ledge of the cabin 12. Other orientation configurations of the console 20 are nevertheless possible.

The console 20 comprises two retractable cup-holders 30, and two retractable supports 32 for screens. Preferably, the console 20 also comprises a retractable table inside the console 20 identical with the one described in patent application FR 15 00208, and for which the masking lid, defining a portion of the supporting surface 26, is designated by reference 34 in FIG. 1.

In the illustrated example, the retractable supports 32 are juxtaposed along the axis B-B' while being positioned rearwards from the masking lid 34, i.e. between the fuselage 14 and the masking lid 34. Moreover, the cup-holders 30 encase the retractable supports 32 along the axis B-B'.

Figure 2:
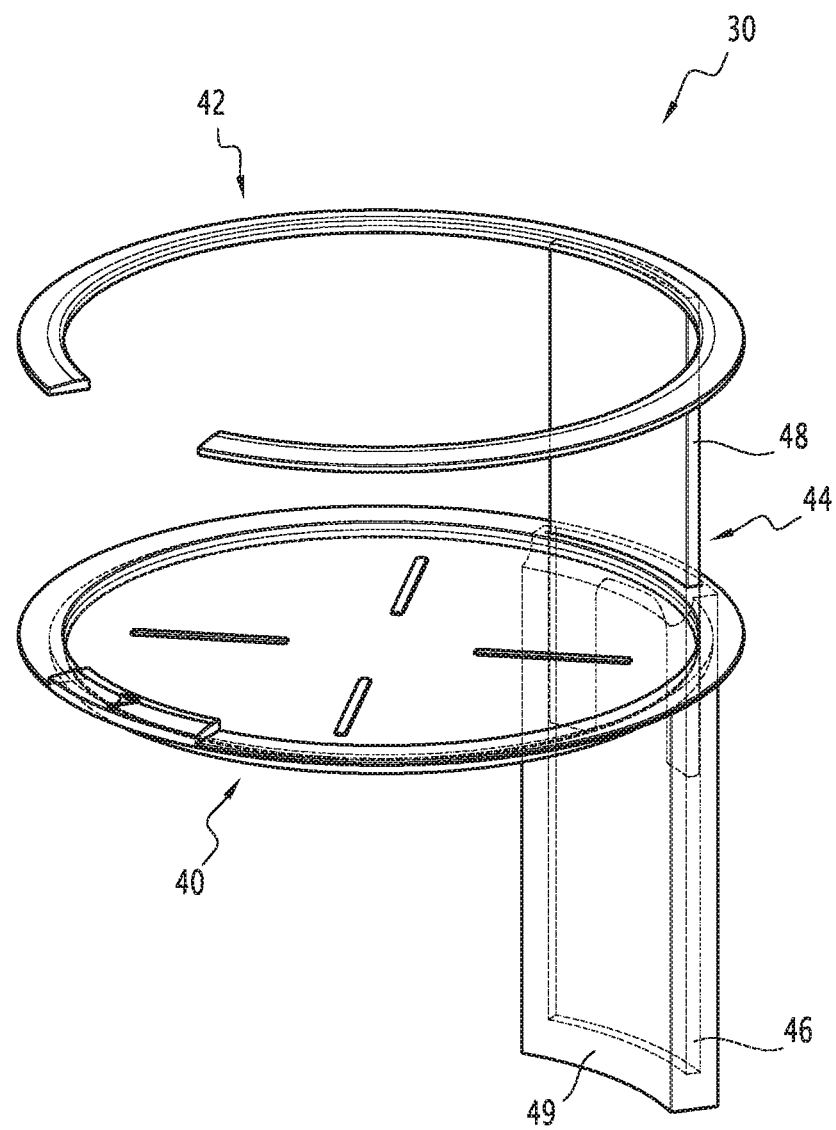
FIG. 2 is a perspective, partly top view of a cup-holder of the interior layout assembly of FIG. 1.

With reference to FIG. 2, each cup-holder 30 comprises a first fixed portion 40 with respect to the frame 21, a second movable portion 42 with respect to the frame 21, and a member 44 for guiding the displacement of the second portion 42 relatively to the first portion 40 in order to limit this displacement to a translation along a vertical direction substantially orthogonal to the floor 16.

The first portion 40 is formed by a saucer which is flush with the supporting surface 26.

The second portion 42 is formed by a split ring substantially extending parallel to the saucer 40. It may be moved relatively to the first portion 40 between a retracted position, in which it is placed beside the first portion 40, and a deployed position, wherein it is away from the first portion 40.

The guiding member 44 comprises a guiding chamber 46, secured to the first portion 40, and a guiding appendage 48, secured to the second portion 42. The guiding chamber 46 is defined inside an outgrowth 49 substantially protruding vertically towards the inside of the console 20 from the first portion 40. The guiding appendage 48 substantially protrudes vertically towards the inside of the console 20 from the second portion 42 and is received inside the chamber 48.

The chamber 46 and the guiding appendage 48 have substantially mating shapes. Each of the chamber 46 and of the guiding appendage 48 in particular has the shape of a cylinder arc.

Preferably, each cup-holder 30 also includes a member for returning the second portion 42 towards its deployed position, and a member for locking the second portion 42 in the retracted position, said locking member being a slap-on fastening locking member adapted so as to be unlocked under the effect of a pressure exerted on the second portion 42 along the translation direction, towards the bottom of the chamber 46. As such locking members are known and currently used in push buttons and in pens with a retractable tip, this locking member will not be described in more detail here.

Alternatively, the locking member is not adapted for being unlocked under the effect of pressure exerted on the second portion 42 along the translation direction. An unlocking member is then provided, adapted for unfastening the locking member by snapping it off, said unlocking member being able to be actuated by the user by means of a control button positioned on the supporting surface 26, near the cup-holder 30.

Figure 3:
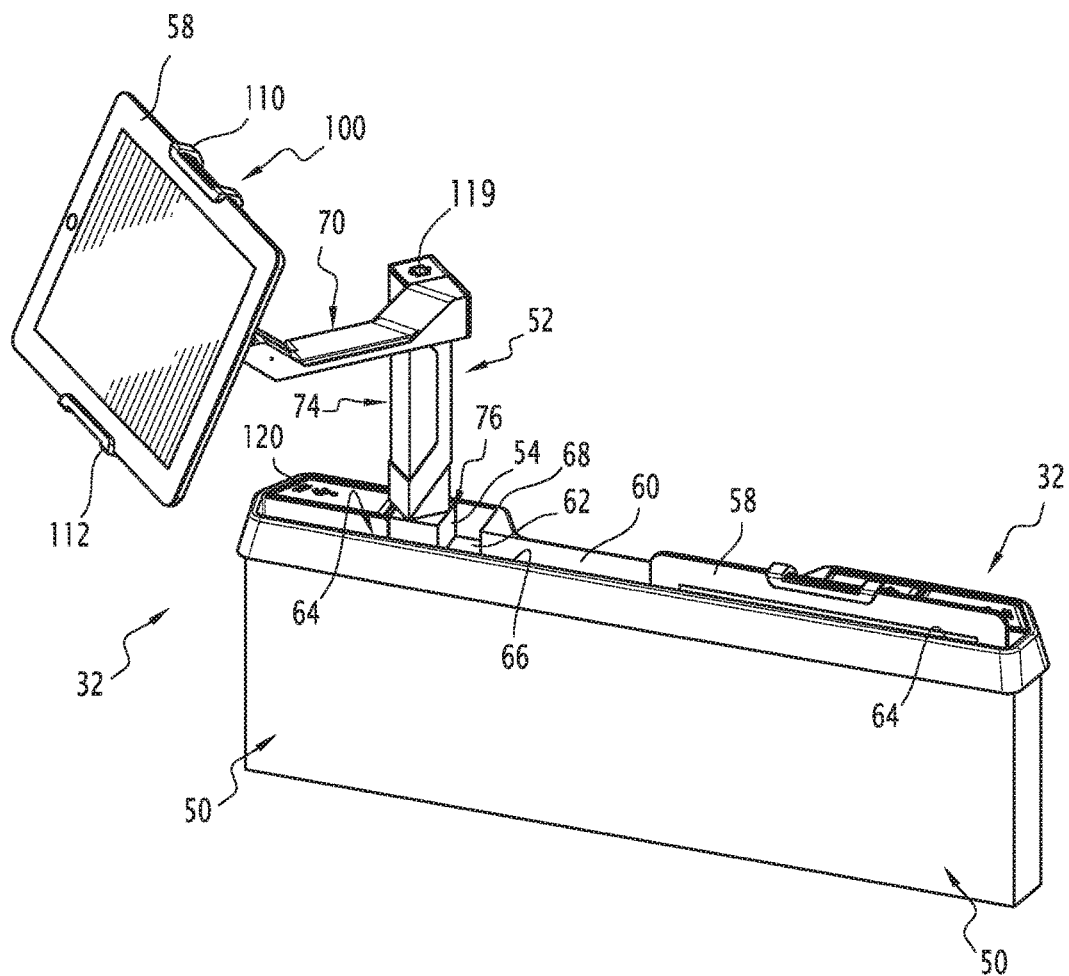
FIG. 3 is a perspective, partly top and front view of two supports for screens of the interior layout assembly of FIG. 1.

With reference to FIG. 3, each retractable support 32 comprises a housing 50, fixed relatively to the frame 21, and a movable arm 52 with respect to the frame 21, said arm 52 comprising a proximal end 54 for jointing with the housing 50 and a distal end 56 (FIG. 4) for jointing with a screen 58.

The housing 50 defines a first space 60 for receiving the screen 58 in a retracted position inside the housing 50, and a second space 62 for receiving the arm 52 in a retracted position inside the housing 50. The housing 50 also has an opening 64, through which the first and second receiving spaces 60, 62 open on the outside of the housing 50, and a bottom, opposite to the opening 64.

The first receiving space 60 is dimensioned in order to receive the screen 58 vertically oriented and in landscape format, i.e. with the largest dimension of the screen 58 substantially oriented horizontally, with at least 50%, preferably at least 80%, of the screen 58 contained in the housing 50, the portion of the screen 58 not contained in the housing 50 jutting out if required from the housing 50 through the opening 64. For this purpose, the first receiving space 60 has a substantially parallelepipedal shape, with a direction of largest dimension substantially oriented parallel to the axis B-B', and a direction of smallest dimension substantially oriented horizontally and orthogonally to the axis B-B'.

The second receiving space 62 has a shape substantially mating that of the arm 52 when it is in a retracted configuration which will be described in detail subsequently.

Preferably, the first and second receiving spaces 60, 62 directly communicate with each other. Alternatively, the first and second receiving spaces 60, 62 are separated from each other by a partition.

The opening 64 has the general shape of a T, the bar 66 of the T forming the portion of the opening 64 through which the first receiving space 60 opens on the outside of the housing 50, and the foot 68 of the T forming the portion of the opening 64 through which the second receiving space 62 opens on the outside of the housing 50. The bar 66 of the T is in particular longer than the foot 68 of the T, for example eight times longer than the foot 68 of the T, and the foot 68 of the T is advantageously thicker than the bar 66 of the T, for example twice thicker than the bar 66 of the T. Preferably, as illustrated, the foot 68 of the T is substantially equidistant from the ends of the bar 66 of the T.

In the illustrated example, the housings 50 of both supports 32 are merged together, so that the first receiving spaces 60 of said housings 50 are in direct communication with each other. Alternatively, a partition separates the housings 50 of both supports 32 from each other.

The arm 52 is movably mounted relatively to the housing 50 between a retracted position inside the second receiving space 62 and a deployed position on the outside of the second receiving space 62.

Figure 4:
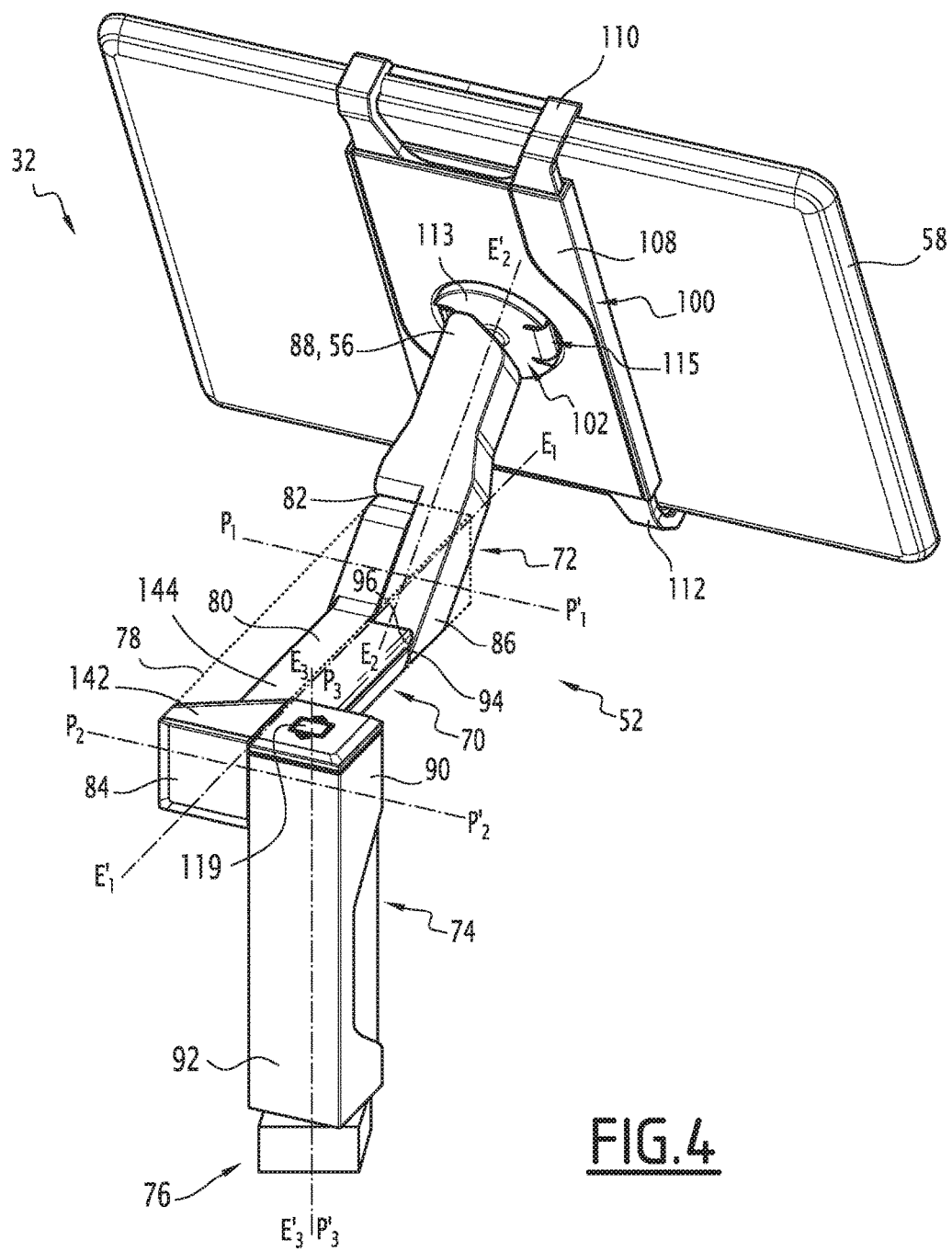
FIG. 4 is a perspective, partly top and rear view, of an arm of one of the supports of FIG. 3.
Figure 6:
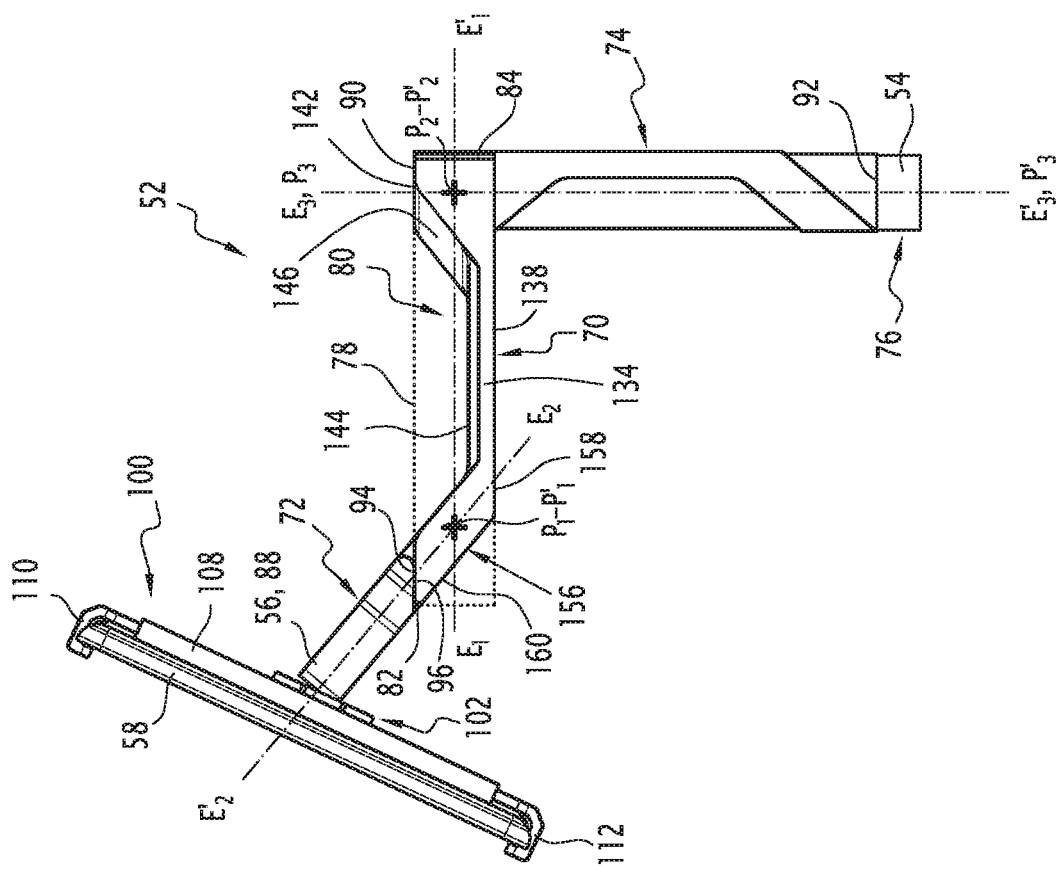
FIG. 6 is a side elevational view of the arm of FIG. 4, in a deployed configuration.
Figure 8:
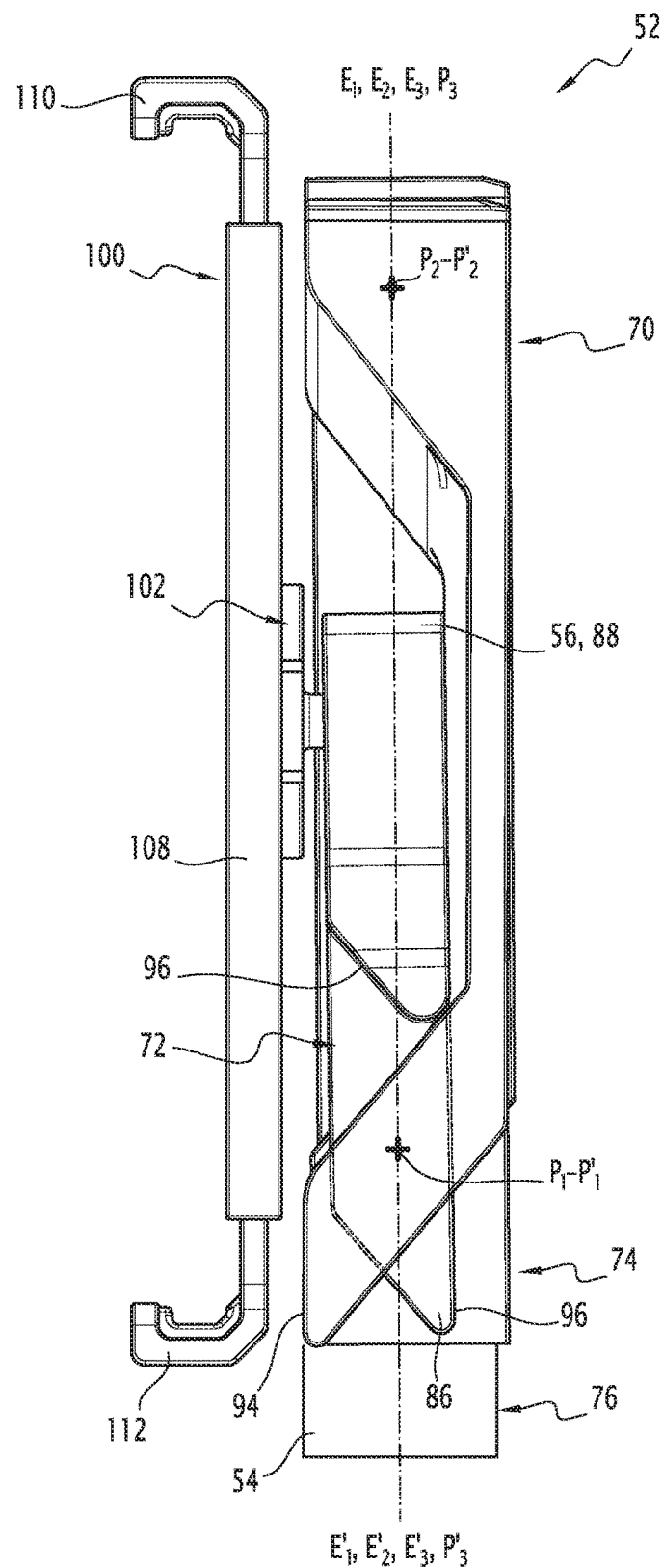
FIG. 8 is a view similar to that of FIG. 6, the arm being in a retracted configuration.

With reference to FIG. 4, the arm 52 is a jointed arm comprising a plurality of rigid segments 70, 72, 74, 76 movable relatively to each other between a retracted configuration of the arm 52, illustrated in FIG. 8, wherein the bulkiness of the arm 52 is a minimum, and a deployed configuration of the arm 52, illustrated in FIG. 6, wherein the distal end 56 is at a maximum distance from the proximal end 54.

Said segments 70, 72, 74, 76 comprise a first segment 70, a second segment 72, a third segment 74, and a fourth segment 76.

In the illustrated example, each of said segments 70, 72, 74, 76 is rectilinear. Alternatively, the segments 70, 72, 74, 76 have shapes other than rectilinear shapes and are for example curved.

The first segment 70 is elongated along a first elongation direction. It has a first elongation axis $E_1$-$E_1'$, formed by a longitudinal median axis of the segment 70 oriented along the first elongation direction.

The first segment 70 has a parallelepipedal casing 78 which is formed by the smallest parallelepiped entirely containing the first segment 70. It defines a recess 80 for receiving the second segment 72 with respect to said parallelepipedal casing 78, said recess 80 being adapted for containing the second segment 72 with a volume of the second segment 72 contained in the recess 80 at least equal to 80% of the volume of the second segment 72. Preferably, the recess 80 is adapted for entirely containing the second segment 72.

The first segment 70 also has first and second opposite ends 82, 84, taken along the first elongation direction. The first end 82 forms an end for jointing with the second segment 72, and the second end 84 forms an end for jointing with the third segment 74.

Figure 5:
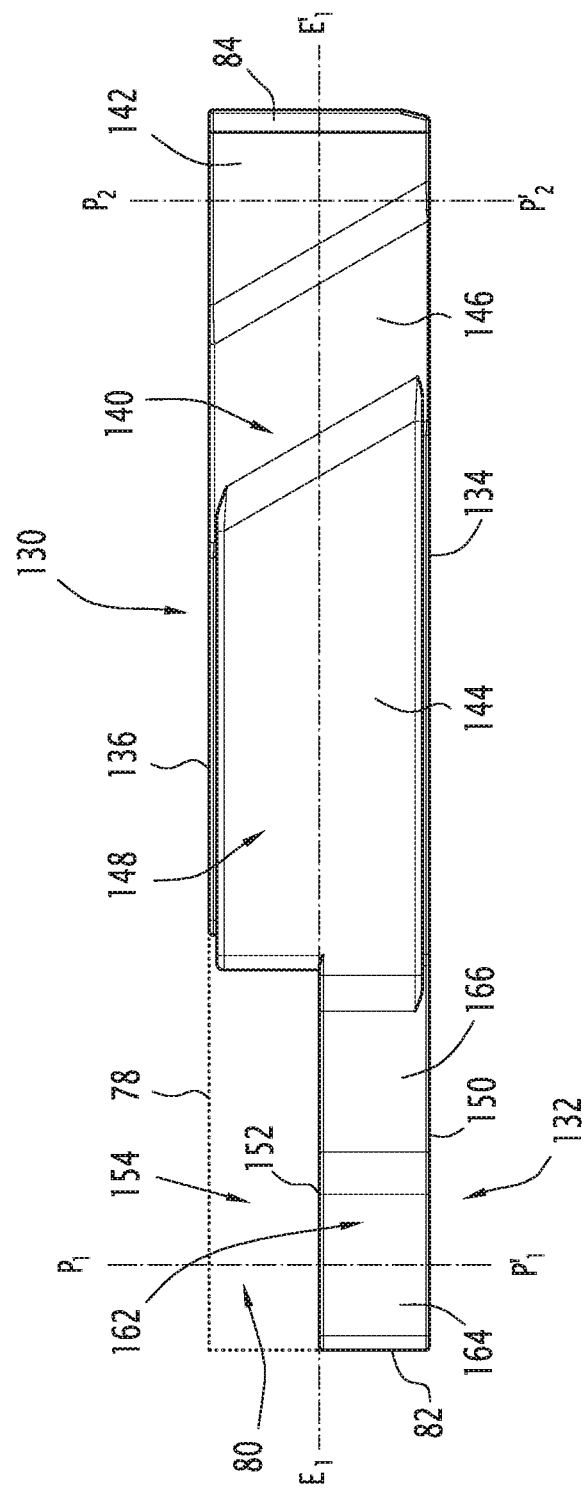
FIG. 5 is a top view of a segment of the arm of FIG. 4.

With reference to FIG. 5, the first segment 70 comprises a body 130, defining the second end 84, and a finger 132 protruding from an end of the body 130 opposite to the second end 84, said finger 132 defining the first end 82.

The body 130 extends, over substantially the whole of its length, over substantially the whole width of the casing 78, taken parallel to a first pivot axis $P_1$-$P_1'$ of the first segment 70 relatively to the second segment 72. In other words, the body 130 comprises two opposite side faces 134, 136, each of said faces being flushed with the casing 78 over substantially the whole of the length of the body 130, taken along the elongation axis $E_1$-$E_1'$. The body 130 is thus laterally centered with respect to the elongation axis $E_1$-$E_1'$.

The body 130 also comprises a lower face 138 (FIG. 6) substantially planar, being flushed with the casing 78 over substantially the whole of the length of the body 130 and over substantially the whole of the width of the body 130.

The body 130 further comprises an upper face 140 opposite to the lower face 138. The upper face 140 comprises an upper planar portion 142, a lower planar portion 144 and, between said planar portions 142, 144, a tilted portion 146.

The upper 142 and lower 144 planar portions are substantially parallel to each other and to the lower face 138.

The upper planar portion 142 extends between the second end 84 and the tilted portion 146, from one side face 134 of the segment 70 to the opposite side face 136. It is flush with the casing 78.

The lower planar portion 144 extends between the finger 132 and the tilted portion 146, from a side face 134 of the segment 70 to the opposite side face 136.

The lower planar portion 144 is set back towards the inside of the segment 70 with respect to the casing 78. The portion of the body 130 which defines this lower planar portion 144 is therefore shifted with respect to the elongation axis $E_1$-$E_1'$ along a direction perpendicular to the elongation axis $E_1$-$E_1'$ and to the first pivot axis $P_1$-$P_1'$. A first space 148 is thus defined between the lower planar portion 144 and the casing 78.

In the illustrated example (see in particular FIG. 6), the elongation axis $E_1$-$E_1'$ crosses the first space 148. The lower planar portion 144 is therefore oriented towards the elongation axis $E_1$-$E_1'$.

The finger 132 is laterally shifted with respect to the elongation axis $E_1$-$E_1'$. In particular, the finger 132 is entirely positioned on a same side of the elongation axis $E_1$-$E_1'$.

The finger 132 comprises a first side face 150 substantially planar which is flushed with the casing 78. This first side face 150 substantially extends in the extension of a side face 134 of the body 130.

The finger 132 also comprises a second side face 152 substantially planar and substantially parallel to the first side face 150. This second side face 152 is set back towards the inside of the segment 70 with respect to the casing 78; a second space 154 is thus defined between the second side face 152 and the casing 78. In particular, the second face 152 is flushed with the elongation axis $E_1$-$E_1'$.

The finger 132 further comprises a lower face 156 (FIG. 6). This lower face 156 comprises a lower planar portion 158 (FIG. 6) and a tilted portion 160 (FIG. 6).

The lower planar portion 158 is flushed with the casing 78. It extends substantially in the extension of the lower face 134 of the body 130.

The tilted portion 160 extends from the lower planar portion 158 as far as the first end 82. It is substantially planar. It is oriented opposite to the body 130.

The finger 132 finally comprises an upper face 162. This upper face 162 comprises an upper planar portion 164 and a tilted portion 166.

The upper planar portion 164 is flushed with the casing 78. It extends from the tilted portion 166 as far as the first end 82, over substantially the whole of the width of the finger 132.

The tilted portion 166 extends between the body 130 and the upper planar portion 164. It is substantially planar. It is oriented towards the body 130. In the illustrated example, it is substantially parallel to the tilted portion 160.

The first and second spaces 148, 154 are placed beside each other. The recess 80 is formed by the joining up of said first and second spaces 148, 154.

Referring back to FIG. 4, the second segment 72 is elongated along a second elongation direction. It has a second elongation axis $E_2$-$E_2'$, formed by a longitudinal median axis of the segment 72 oriented along the second elongation direction.

The second segment 72 comprises first and second opposite ends 86, 88, taken along the second elongation direction. The first end 86 forms an end for jointing with the first segment 70, and the second end 88 defines the distal end 56.

The third segment 74 is elongated along a third elongation direction. It has a third elongation axis $E_3$-$E_3'$, formed by a longitudinal median axis of the segment 74 oriented along the third elongation direction.

The third segment 74 has a general parallelepipedal shape substantially identical with that of the parallelepipedal casing 78.

The third segment 74 has first and second opposite ends 90, 92, taken along the third elongation direction. The first end 90 forms an end jointed with the first segment 70, and the second end 92 forms an end jointed with the fourth segment 76.

The fourth segment 76 defines the proximal end 54. It is positioned in the extension of the third segment 74; in other words, at least one portion of the third segment 74 is crossed by the third elongation axis $E_3$-$E_3'$.

Figure 7:
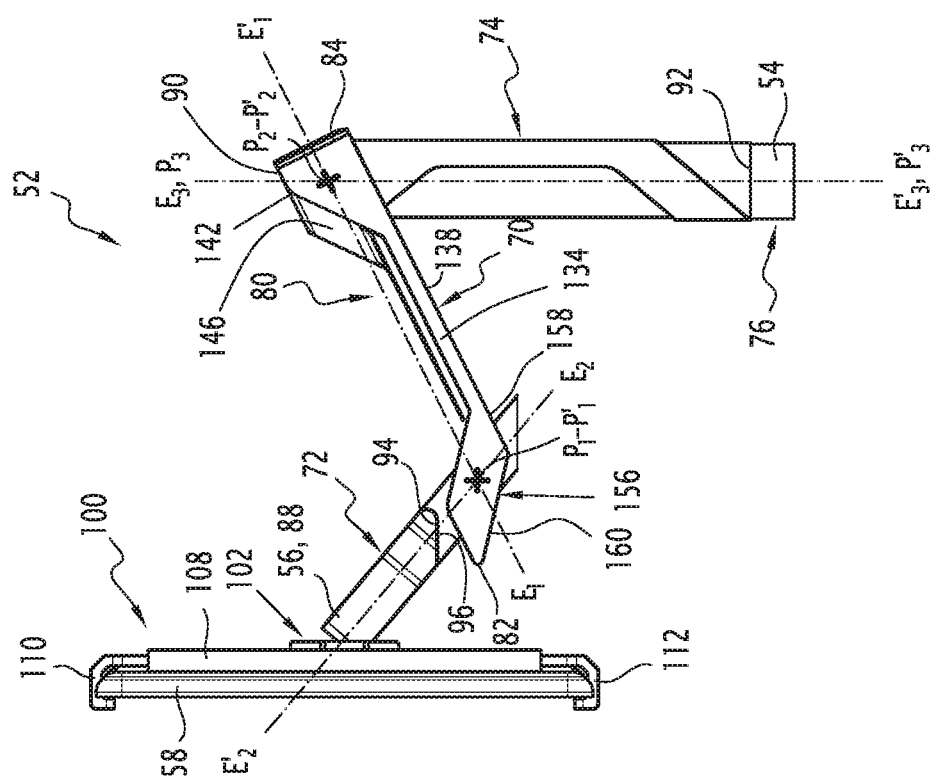
FIG. 7 is a view similar to that of FIG. 6, the arm being in an intermediate configuration.

As visible in FIGS. 6 to 8, the first segment 70 is jointed with respect to the second segment 72 so that the second segment 72 pivots relatively to the first segment 70 around the first pivot axis $P_1$-$P_1'$ between a compact configuration, illustrated in FIG. 8, in which the second segment 72 is fitted into the recess 80, and an extended configuration, illustrated in FIG. 6, in which the second segment 72 extends out of said recess 80 and therefore out of the parallelepipedal casing 78. By «fitted into the recess 80», is meant that the second segment 72 is in majority contained inside the recess 80, at least 80% of the volume of the second segment 72 being contained inside the recess 80.

Preferably, the second segment 72 is entirely fitted into the recess 80 when the first and second segments 70, 72 are in a compact configuration, i.e. that the second segment 72 does not jut out from the recess 80. Thus, when the first and second segments 70, 72 are in a compact configuration, the bulkiness of said segments 70, 72 is limited to the bulkiness of the parallelepipedal casing 78 of the first segment 70.

The first pivot axis $P_1$-$P_1'$ is substantially orthogonal to the first and second elongation axes $E_1$-$E_1'$, $E_2$-$E_2'$.

In a compact configuration, the first and second elongation axes $E_1$-$E_1'$, $E_2$-$E_2'$ are parallel to each other, and are in particular substantially coaxial. In an extended configuration, the first and second elongation axes $E_1$-$E_1'$, $E_2$-$E_2'$ form an angle with each other.

Regardless of the relative positions of the first and second segments 70, 72, the first and second elongation axes $E_1$-$E_1'$, $E_2$-$E_2'$ are contained in a same plane.

The compact configuration corresponds to the configuration occupied by the first and second segments 70, 72 when the arm 52 is in a retracted configuration. The extended configuration corresponds to the configuration occupied by the first and second segments 70, 72 when the arm 52 is in a deployed configuration.

In a compact configuration, the distal end 56 is interposed between the first and second ends 82, 84 of the first segment 70. On the other hand in an extended configuration, the first end 82 is interposed between the distal end 56 and the second end 84. This gives the possibility of having a large deployment of the arm 52.

The first segment 70 moreover comprises, at its first end 82, abutment surfaces 94 for the second segment 72 in an extended configuration. These abutment surfaces 94 are parallel to the first pivot axis $P_1$-$P_1'$. They are adapted for cooperating with additional abutment surfaces 96 of the second segment 72, so as to ensure solid support of the second segment 72 in an extended configuration and to prevent that, driven by the weight of the screen 58, the second segment 72 pivots beyond the extended configuration.

In the illustrated example, one of these abutment surfaces 94 is formed by an upper planar portion 164 of the upper face 162 of the finger 132.

The first segment 70 is also jointed with respect to the third segment 74 so that the third segment 74 pivots relatively to the first segment 70 around a second pivot axis $P_2$-$P_2'$ between a folded-back position, illustrated in FIG. 8, wherein the first and third segments 70, 74 are placed side by side over substantially the whole of their length, and an unfolded position, illustrated in FIG. 6, in which the first and third segments 70, 74 are substantially orthogonal to each other. In other words, in the folded-back position, the first and third elongation axes $E_1$-$E_1'$, $E_3$-$E_3'$ are parallel with each other, the first and third segments 70, 74 being juxtaposed with each other and, in the unfolded position, the first and third elongation axes $E_1$-$E_1'$, $E_3$-$E_3'$ are orthogonal to each other.

Preferably, the interface between the first and third segments 70, 74 have a sufficiently high friction coefficient for allowing the first and third segments 70, 74 to be maintained in the unfolded position by means of the sole effect of the friction force between said segments 70, 74. Alternatively, an indexed system with beads or notches is provided at said interface.

Advantageously, the interface between the first and third segments 70, 74 comprises an abutment adapted for preventing the pivoting of the third segment 74 beyond the unfolded position.

In a folded-back configuration, the first and third elongation axes $E_1$-$E_1'$, $E_3$-$E_3'$ are contained in a same plane, said plane being parallel to the second pivot axis $P_2$-$P_2'$. In the unfolded position, the first and third elongation axes $E_1$-$E_1'$, $E_3$-$E_3'$ are contained in different planes, said planes being spaced apart from each other along the second pivot axis $P_2$-$P_2'$.

The first and second pivot axes $P_1$-$P_1'$, $P_2$-$P_2'$ are substantially parallel with each other. Preferably they are substantially horizontal.

The second pivot axis $P_2$-$P_2'$ is substantially orthogonal to the first and third elongation axes $E_1$-$E_1'$, $E_3$-$E_3'$.

The folded-back position corresponds to the position occupied by the third segment 74 when the arm 52 is in a retracted configuration, and the unfolded position corresponds to the position occupied by the third segment 74 when the arm 52 is in a deployed configuration.

Thus, when the arm 52 is in a retracted configuration, the elongation axes $E_1$-$E_1'$, $E_2$-$E_2'$, $E_3$-$E_3'$ are all contained in a same plane, and the bulkiness of the arm 52 is limited to the bulkiness of a parallelepiped formed by affixation of the parallelepipedal casing 78 and of the third segment 74: the arm 52 is therefore then very compact.

The fourth segment 76 is jointed with the third segment 74 so as to pivot relatively to the third segment 74 around a third pivot axis $P_3$-$P_3'$ substantially parallel to the third elongation axis $E_3$-$E_3'$, and in particular substantially coaxial with said third elongation axis $E_3$-$E_3'$.

The third pivot axis $P_3$-$P_3'$ is substantially orthogonal to the first and second pivot axes $P_1$-$P_1'$, $P_2$-$P_2'$. It is preferably substantially vertical. It thus allows a passenger who would not be found facing the console 20 of orienting the arm 52, and therefore the screen 58, in his/her direction.

Advantageously, the interface between the third and fourth segments 74, 76 comprises an abutment adapted for preventing the pivoting of the fourth segment 76 by more than 10° in one direction and by more than 90° in the other direction beyond a position in which the screen 58 is substantially parallel to the direction of largest dimension of the first receiving space 60.

Referring back to FIG. 4, each support 32 also comprises a member 100 for attaching the screen 58 to the support 32, a jointed connection 102 for jointing the attachment member 100 with the distal end 56 of the arm 52, and a sliding connection for sliding the proximal end 54 of the arm 52 relatively to the housing 50.

The screen 58 is, in the illustrated example, a personal tactile tablet. The attachment member 100 is therefore a reversible attachment member adapted so that a passenger may easily attach the screen 58 to the support 32 and may easily detach the screen 58 from the support 32.

For this purpose, the attachment member 100 comprises a body 108 and at least one pair of jaws 110, 112 mounted so as to be movable in translation relatively to the body 108 between a configuration for releasing the screen 58, in which the jaws 110, 112 are moved away from each other along an axis, and a clamped configuration of the screen 58, in which the jaws 110, 112 are brought closer to each other along said axis. A blocking member gives the possibility of retaining the jaws 110, 112 in a clamped configuration. In the illustrated example, the attachment member 100 comprises a single pair of jaws 110, 112. Alternatively, the attachment member 100 comprises two pairs of jaws 110, 112, the axes of said pairs of jaws being substantially oriented perpendicularly to each other, said pairs of jaws being maneuverable together by means of a common control member.

In the illustrated example, the attachment member 100 further comprises a removable interface element 113 forming the interface of the attachment member 100 with the arm 52. This interface element 113 is attached to the arm via the jointed connection 102, and is attached to the body 108 via a connection 115 which may be dismantled.

In the illustrated example, this dismountable connection 115 comprises mating members which may be fastened, snapped on, borne by the interface element 113 and by the body 108. Alternatively, the dismountable connection 115 comprises a rib attached to an element from among the interface element 113 and the body 108, and a mating groove formed in the other element from among the interface element 113 and the body 108. Still alternatively, the dismountable connection 115 comprises two magnets one borne by the interface element 113 and the other one by the body 108.

In another embodiment of the invention, the screen 58 is permanently fixed to the support 32. The attachment member 100 is then typically formed with a supporting element on which the screen 58 is screwed, held by suction, clipped or stuck.

The jointed connection 102 is adapted for allowing rotation of the attachment member 100 relatively to the arm 52 around at least two axes not parallel to the second elongation axis $E_2$-$E_2'$.

Preferably, the jointed connection 102 has a significant friction coefficient so as to allow the attachment member 100 to be maintained in position by the sole effect of the friction force.

In the illustrated example, the jointed connection 102 is formed by a ball-joint connection, so as to allow rotation of the attachment member 100 relatively to the arm 52 not only around said two axes not parallel to the second elongation axis $E_2$-$E_2'$, but also around the second elongation axis $E_2$-$E_2'$. The jointed connection 102 is thus suitable for allowing orientation of the screen 52 both in the landscape mode and in the portrait mode.

A recess is then made in the distal end 56 of the arm 52 in order to allow accommodation of the ball-joint connection in the arm 52 when the arm 52 is in a retracted configuration.

Alternatively, the jointed connection 102 is formed by a ball-joint connection with a finger, typically formed by a pivotally mounted part around a first axis relatively to the distal end 56 of the arm 52 and pivotally mounted around a second axis, orthogonal to the first axis, relatively to the attachment member 100.

Figure 9:
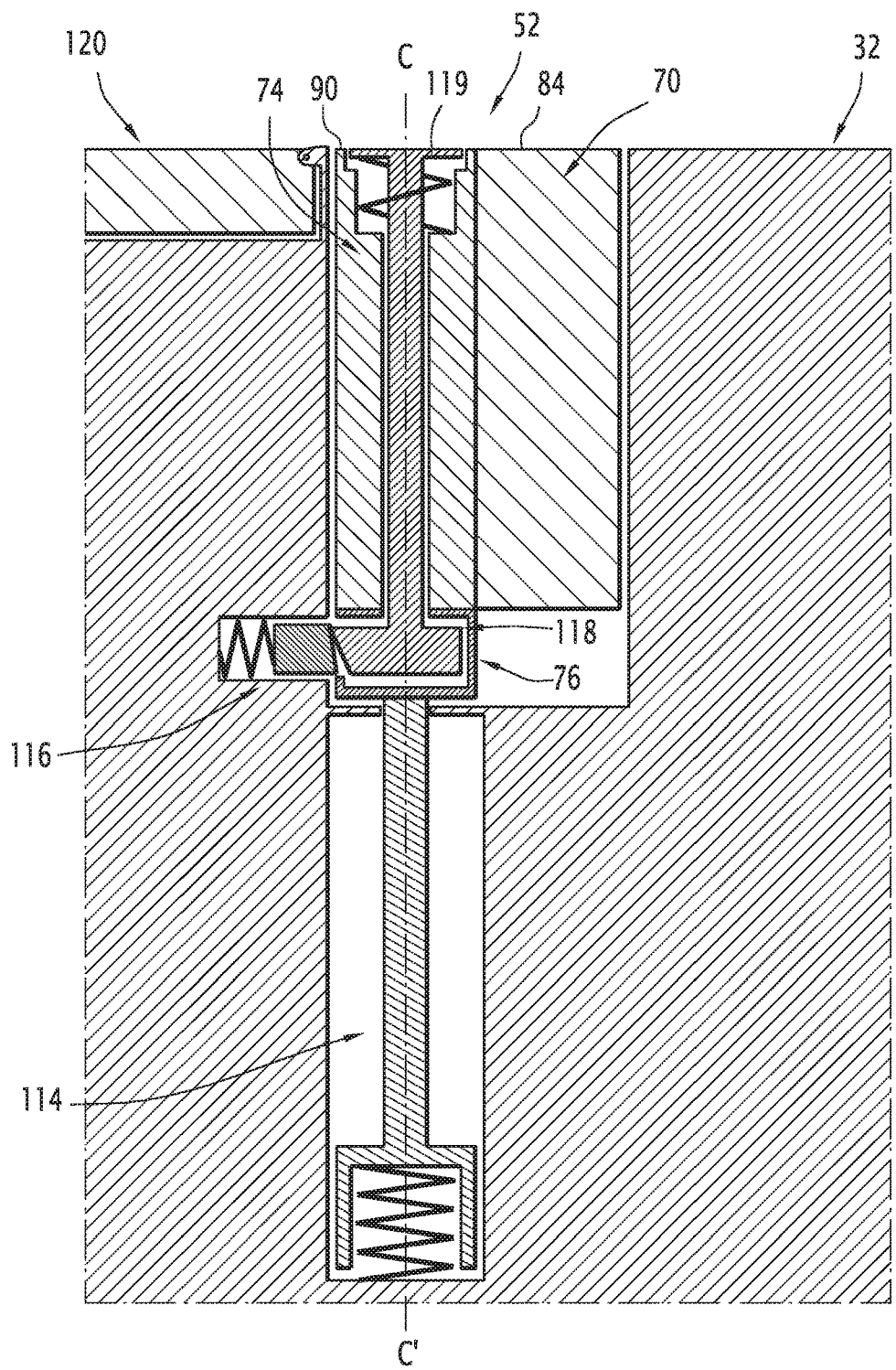
FIG. 9 is a schematic sectional view of one of the supports of FIG. 3, the arm of said support being in a retracted position.
Figure 10:
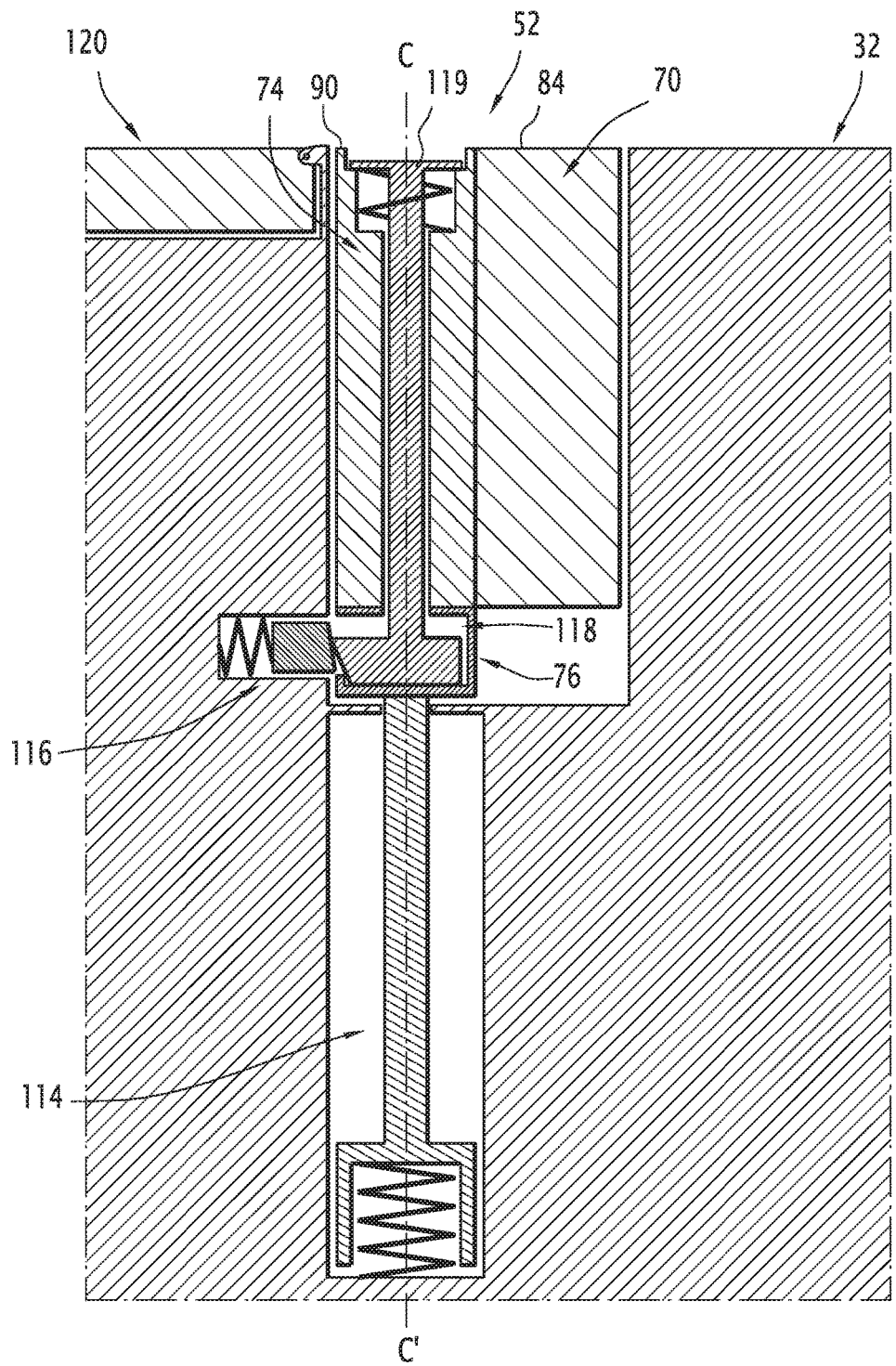
FIG. 10 is a view similar to that of FIG. 9, a member for unlocking the arm being actuated.
Figure 11:
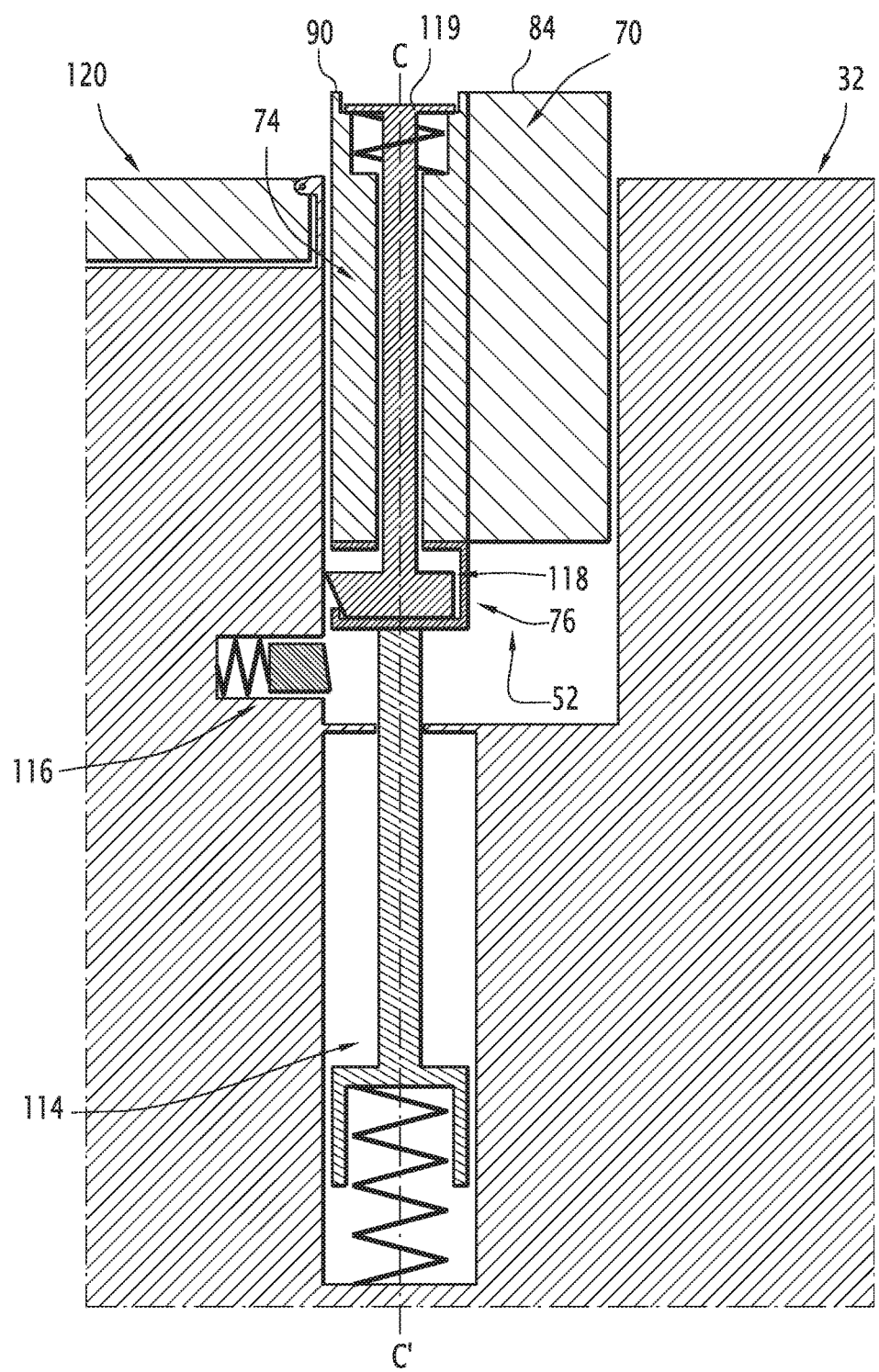
FIG. 11 is a view similar to that of FIG. 9, the arm being deployed.

With reference to FIG. 9, the slider connection is adapted for allowing sliding of the proximal end 54 of the arm 52 relatively to the housing 50 along a sliding direction C-C'. Retraction of the arm 52 into the housing 50 and deployment of the arm 52 out of the housing 50 is therefore ensured by displacing the arm 52 along said sliding direction C-C'.

The sliding direction C-C' is in particular substantially parallel to the third elongation axis $E_3$-$E_3'$.

The support 32 also includes a member 114 for returning the arm 52 to its deployed position, and a member 116 for locking the arm 52 in a retracted position, said locking member 116 being a locking member by snap-on fastening.

In the illustrated example, the support 32 further includes an unlocking member 118, suitable for unfastening the locking member 116 by snapping it off, said unlocking member 118 comprising an actuation button 119 positioned at the first end 90 of the third segment 74.

Alternatively, the locking member 116 is adapted for being unlocked under the effect of pressure exerted on the arm 52 along the sliding direction, towards the bottom of the housing 50. As such locking members are known and currently used in push buttons and in pens with a retractable tip, this locking member will not be described in more detail here.

The support 32 also comprises a member 120 for supplying the screen 58 with electric energy. As the screen 58 is, in the illustrated example a personal tactile tablet, the power supply member 120 is formed by an electrical socket, typically a USB socket, electrically connected to a source of electric energy.

Preferably, the electrical socket 120 is positioned under a hatch jointed by a pivot with the housing 50.

Advantageously, the supports 32 are symmetrical supports relatively to each other, relatively to a vertical middle plane positioned so as to be equidistant from the supports 32.

A method for handling one of the supports 32 will now be described, with reference to FIGS. 3 to 11.

The arm 52 is initially retracted in the housing 50, no screen being attached to the support 32. The arm 52 is itself in a retracted configuration, i.e. the second segment 72 is fitted into the recess 80 of the first segment 70, and the first and third segments 70, 74 are placed side by side over substantially the whole of their length. The second end 84 of the first segment 70 and the first end 90 of the third segment 74 are then flushed with the opening 64, and the attachment member 100 is accommodated in the first receiving space 60 of the housing 50.

A passenger first of all exerts pressure on the actuation button 119. This has the effect of unlocking the locking member 116. Under the effect of the return member 114, the arm 52 is deployed outside the housing 50, and the attachment member 100 exits the first receiving space 60.

The arm 52 is then in a retracted configuration, outside the housing 50, and the attachment member 100 is also outside the housing 50. The passenger may therefore grasp the attachment member 100 and pull it towards him/her. By doing this, the passenger causes deployment of the arm 52, which passes from its retracted configuration to its deployed configuration, as illustrated in FIG. 7. If the passenger is not placed facing the support 32, he/she may also pivot the arm 52 around the third pivot axis $P_3$-$P_3'$, so as to bring the attachment member 100 facing him/her.

Once the attachment member 100 is at a comfortable distance from the passenger, the latter inserts his/her personal tactile tablet between the jaws 110, 112 of the attachment member 100, so that the latter will clamp the tactile tablet. He/she may then release his/her tactile tablet and comfortably browse the contents of said tablet, without having to lean forwards and without having any hand occupied with holding the tablet.

If the position of the tablet is not suitable for him/her, the passenger may adjust its orientation by means of the jointed connection 102 and of the joint between the third and fourth segments 74, 76. Further, the passenger may easily have the tablet switch between the portrait mode and the landscape mode by pivoting it around the axis $E_2$-$E_2'$ by means of the jointed connection 102. Finally, if the passenger notices that the battery level of the tablet is low, he/she may recharge the latter by connecting it to the electrical socket 120 by means of a recharging cable.

When the passenger has finished using the tablet and if he/she wishes to put it away, he/she puts it back into a landscape position and folds back the arm 52 so that it returns to the folded-back configuration. The passenger may also pivot the arm 52 around the third pivot axis $P_3$-$P_3'$, so that the tablet is again found oriented parallel to the direction of largest dimension of the first receiving space 60. Finally, the passenger presses on the attachment element 100 or on the second end 84 of the first segment 70, along the sliding direction and towards the bottom of the housing 50, so as to drive in the arm 52 into the housing 50. The passenger maintains this pressing action until the arm 52 comes into abutment. The passenger then releases his/her pressure, and the arm 52 moves up a little under the effect of the force of the return member 114, but this upward movement is rapidly blocked by the locking member 116 which is fastened, snapped on; the arm 52 is then retracted into the second receiving space 62, and the tablet is retracted inside the first receiving space 60.

Preferably, the support 32 is adapted so that, once the tablet is retracted in the housing 50, an upper band of said tablet, preferably with a height comprised between 5 and 45 mm, remains outside the housing 50. This actually allows the tablet to remain visible and to avoid that the passenger forgets it upon leaving the aircraft.

By means of the description above, it therefore becomes possible to retract both a screen and its support in the side ledge of an aircraft, while allowing easy handling of the screen.

What is claimed is:

1. A retractable support for a screen, comprising:
    a housing for receiving the screen in a retracted position,
    an arm, movably mounted relatively to the housing between a retracted position inside the housing and a deployed position outside the housing, the arm comprising a proximal end jointed with the housing and a distal end jointed with the screen, and
    an attachment for attaching the screen to the support, connected to the distal end of the arm, the arm comprising first and second rigid segments jointed with each other so that the second segment pivots relatively to the first segment around a first pivot axis between a compact configuration, in which the second segment is fitted into a recess of the first segment, and an extended configuration, in which the second segment extends outside said recess, the support being adapted so that, once the screen is retracted in the housing, a portion of the attachment protrudes outside the housing.

2. The retractable support of claim 1, comprising a jointed connection jointing the attachment with the distal end of the arm so that the attachment is rotatable around at least two axes relatively to the distal end.

3. The retractable support of claim 1, wherein the second rigid segment defines the distal end.

4. The retractable support of claim 1, wherein the arm comprises a third rigid segment jointed with the first rigid segment so as to pivot relatively to the first rigid segment around a second pivot axis between a folded-back position, in which the first and third rigid segments are placed beside each other over substantially the whole of their length, and an unfolded position.

5. The retractable support according to claim 4 wherein the first and second pivot axes are substantially parallel to each other.

6. The retractable support according to claim 4 wherein the first and third rigid segments are each substantially rectilinear and, in the unfolded position, the first and third rigid segments are substantially orthogonal to each other.

7. The retractable support according to claim 4 wherein, in the compact configuration, the distal end is interposed between the first and second pivot axes and, in the extended configuration, the first pivot axis is interposed between the distal end and the second pivot axis.

8. The retractable support according to claim 4 wherein the arm comprises a fourth rigid segment jointed with the third rigid segment so as to pivot relatively to the third rigid segment around a third pivot axis.

9. The retractable support according to claim 8 wherein the second and third pivot axes are substantially orthogonal to each other.

10. The retractable support according to claim 8 wherein the fourth segment defines the proximal end.

11. The retractable support according to claim 8 wherein the third rigid segment is substantially rectilinear while being elongated along an elongation direction, and the third pivot axis is substantially parallel to said elongation direction.

12. The retractable support according to claim 11 further comprising a slider connection for sliding the proximal end of the arm relatively to the housing along a sliding direction, the sliding direction being substantially parallel to the elongation direction of the third rigid segment.

13. The retractable support according to claim 1 further comprising a slider connection for sliding the proximal end of the arm relatively to the housing along a sliding direction.

14. The retractable support according to claim 1 wherein the housing defines a first space for receiving the screen in a retracted position and a second space for receiving the arm in a retracted position, the housing also having an opening with the general shape of a T through which the first and second receiving spaces open on the outside of the housing, a bar of the T forming the portion of the opening through which the first receiving space opens on an outside of the housing, and a foot of the T forming the portion of the opening through which the second receiving space opens on the outside of the housing.

15. The retractable support according to claim 1 wherein the attachment comprises a body and at least one pair of jaws mounted so as to be movable in translation relatively to the body between a configuration for releasing the screen, in which the jaws are moved away from each other along an axis, and a clamped configuration for clamping the screen, in which the jaws are brought closer to each other along said axis.

16. The retractable support of claim 15, wherein the attachment comprises a blocking member for retaining the jaws in their clamped configuration.

17. The retractable support of claim 15, wherein the attachment is connected to the arm via a connection which is substantially centered on the body.

18. The retractable support of claim 1, wherein the attachment is connected to the arm via a dismountable connection which allows detachment of the attachment from the arm.

19. An interior layout assembly of an aircraft cabin comprising a console including at least one of the retractable support according to claim 1.

* * * * *